United States Patent [19]

Goverde

[11] 4,013,288
[45] Mar. 22, 1977

[54] HOCKEY STICK

[75] Inventor: Ludovicus Jacobus Goverde, Whitby, Canada

[73] Assignee: Ontario Tool Design Inc., Ontario, Canada

[22] Filed: July 14, 1975

[21] Appl. No.: 595,693

[30] Foreign Application Priority Data

May 20, 1975  Canada .................. 227368

[52] U.S. Cl. ................ 273/67 A; 273/DIG. 6
[51] Int. Cl.² ............................ A63B 59/14
[58] Field of Search ........... 273/67 A, 72 R, 73 F, 273/73 K, 80 R, 80 B, 82 R, 82 A, 167 R, DIG. 6; 280/11.13 L, 11.13 M

[56] References Cited

UNITED STATES PATENTS

| | | | |
|---|---|---|---|
| 1,501,344 | 7/1924 | Hubbard | 273/80.2 |
| 1,536,606 | 5/1925 | Bishop et al. | 273/82 A |
| 2,064,435 | 12/1936 | Loeffler | 273/82 A X |
| 2,880,002 | 3/1959 | Wetty | 273/167 R X |
| 3,265,401 | 8/1966 | Spier | 273/80 B X |
| 3,268,636 | 8/1966 | Angell | 273/82 R X |
| 3,306,960 | 2/1967 | Weissman et al. | 273/82 R X |
| 3,352,566 | 11/1967 | Kennedy | 273/73 K X |
| 3,644,168 | 2/1972 | Bonk et al. | 273/82 R X |
| 3,816,573 | 6/1974 | Hashimoto et al. | 273/73 K X |
| 3,930,658 | 1/1976 | Howe et al. | 273/73 K X |

FOREIGN PATENTS OR APPLICATIONS

| | | | |
|---|---|---|---|
| 847,193 | 7/1970 | Canada | 273/67 A |
| 918,697 | 1/1973 | Canada | 273/67 A |
| 641,073 | 5/1962 | Canada | 273/DIG. 7 |
| 2,005,952 | 10/1971 | Germany | 273/67 A |
| 42,515 | 4/1970 | Finland | 273/67 A |
| 962,312 | 12/1949 | France | 273/73 K |
| 1,121,051 | 7/1968 | United Kingdom | 273/67 A |
| 1,188,601 | 4/1970 | United Kingdom | 273/67 A |
| 272,851 | 8/1970 | U.S.S.R. | 273/67 A |

*Primary Examiner*—Richard J. Apley
*Attorney, Agent, or Firm*—Cushman, Darby & Cushman

[57] ABSTRACT

A hockey stick is made as a unitary, injection molded product from foamed nylon mixed with glass fibre. The use of foamed nylon results in a relatively lense shell on surface and a core having reduced density. There are no cavities in the stick such as in known hockey sticks or the like made of plastic material. The stick maintains its shape after molding due to a relatively low stress caused by molding pressure which is low in comparison with that required in the production of known plastic hockey sticks. The stick is generally identical to a regular wooden stick from the standpoint of weight and that of weight distribution. An embodiment of the stick with aluminum reinforcement of its blade portion is also disclosed.

4 Claims, 9 Drawing Figures

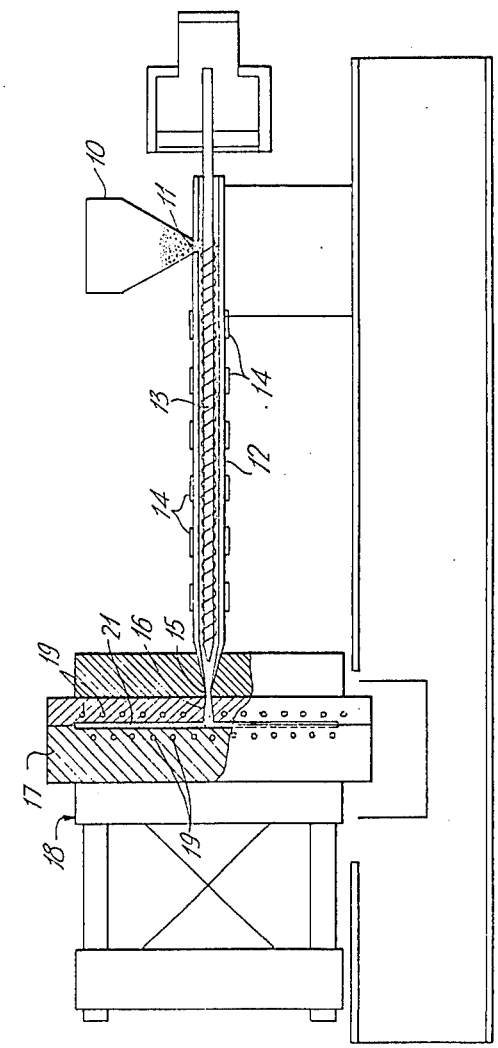

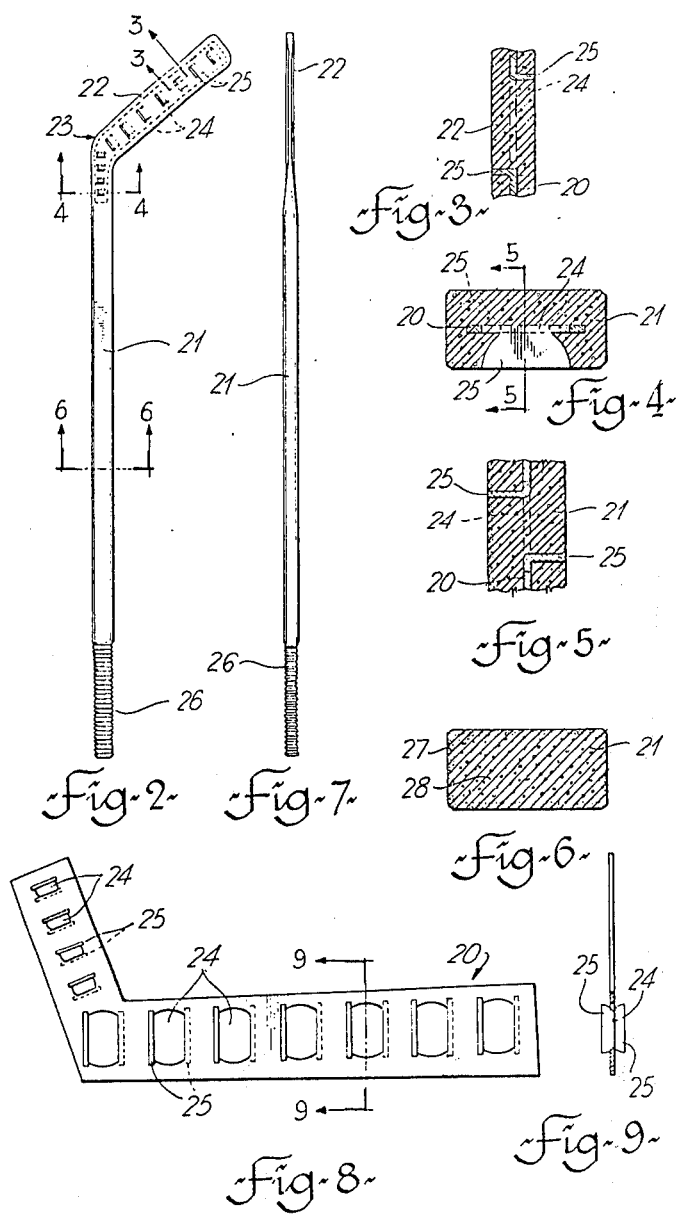

HOCKEY STICK

The present invention relates to a method for producing a hockey stick and to the hockey stick produced by the method.

Hockey stick belongs to sporting equipment that has undergone many attempts directed towards replacing the conventional wooden sticks by various types of thermoplastic or thermosetting materials. Thus, Canadian patent 847,193 to (Bassett) discloses a replaceable blade and shank for a hockey stick, the blade and shank being produced as a molded product in the shank portion of which is inserted the end of the handle of a previously broken stick. Canadian patent 918,697 (Limantour) discloses a single-piece molded hockey stick the handle of which has a pyramidcal hollow narrowing towards the blade end of same, the blade itself being made with a fully solid cross-section. Canadian patent 851,589 (Klay) discloses a hockey stick produced by way of molding the blade as a separate piece, then producing a tubular molded shaft, filling the shaft with a light and pressure-proof foam and, finally, joining the two portions at a premolded joint.

The object of the foresaid attempts is to produce a relatively inexpensive hockey stick the overall weight and the weight distribution of which is as close as possible to a conventional wooden stick, and which has strength at least the same but preferably greater than a wooden hockey stick. The attempts of this type have been going on for some 25 years and have thus far failed to meet all of the requirements as listed above. For instance, Bassett is intended as a cheap, popular imitation for use in street hockey. The two-piece stick as shown in this reference has a relatively heavy blade portion and the socket joint between the shaft and the blade falls far from meeting even the basic strength requirements. Bassett therefore meets only the task of a relatively inexpensive product. Limantour presents an improvement over Bassett in that it shows a unitary, molded hockey stick which may be stronger in the joinder of the heel portion of the blade and the shank or handle part of the stick. The strength of the Limantour stick is further improved by inclusion in the molded plastic material reinforcement of the type of fibrous material such as glass fibre. However, due to the hollow shank, which is necessary to obtain an inexpensive product of acceptable appearance the free of surface deformation, results in that the weight distribution of the shaft is far from the uniformity normally present in wooden sticks. An attempt to overcome this drawback by producing the shaft of Limantour with a hollow of uniform cross-section is bound to result in an even greater weight difference between various sections of the shaft and of the stick and also reviews the strength of the joinder between the blade and the shaft. Klay has attempted to overcome the above drawback by producing separately the blade and the shaft, the latter being produced of a tube of synthetic resin reinforced with glass fibre and filled with a light and pressure-proof hardened foam. Although the foam filling improves the strength of the shaft, the vital strength of the joinder between the blade and the shaft at the heel of the hockey stick is not sufficient as the property of the foamed filler is only functional as a reinforcement of the shaft but not of the said joinder. Moreover, the product of this type of stick is unlikely to be relatively inexpensive as it requires two separate molding operations, one foam filling operation and final step of joining two parts together.

It is an object of the present invention to substantially reduce the above drawbacks and to produce a hockey stick which is relatively inexpensive to produce, the weight distribution of which is substantially the same as that of a wooden stick and the strength of which is at least the same as that of a wooden stick. One of the prerequisites of meeting the above object is that the stick be produced in a single molding operation, that the material from which the stick is formed be free of any hollows such as in Limantour, and that injection be carried out at a relatively low pressure to avoid deformation of the final product which is normally present at a relatively bulky mass of molded substance which the hockey stick would normally produce in the absence of any of the said hollows.

Accordingly, the present invention provide a method of producing a hockey stick by injection molding. The method is carried out by injecting a molding mass into a form having the shape of the entire hockey stick. In other words, the mold produces a cavity having a blade portion and a shaft portion. A heated molten mixture is injected into the mold, the mixture containing 95 to 99% of basic thermoplastic mixture and 5 to 1% by weight of a blowing agent, the mixture being heated to approximately 290° C before entering the mold cavity. After the mold has been completely filled with said mixture, the mold is cooled to reduce the temperature of the injected material considerably below melting point of same, whereafter the molded stick can be ejected from the mold following its opening. Thus, a unitary hockey stick is produced by a relatively low pressure single injection molding, the hockey stick having weight properties substantially corresponding to those of a wooden stick. The basic thermoplastic mixture contains 50% to 70% by weight of nylon and 50% to 30% by weight of fibre glass filler; the flowing agent contains about 95% of nitrogen producing powder and about 5% to 1% of rubber particles. In carrying out one embodiment of the said method, step is included in the method of securing a unitary metal sheet insert in the mold, the insert having a blade portion and a shaft portion, said blade portion having peripheral contour generally coincident with but slightly smaller than that of the blade portion of the mold, the thickness of said metal sheet being smaller than that of the most shallow part of said mold. The shaft portion of the insert extends into the lower end of the shaft portion of the mold.

The hockey stick according to the present invention is a unitary hockey stick produced from foamed thermoplastic material such as nylon and having a blade portion a shaft portion and a heel portion at the joinder of the former two. A unitary reinforcement metal sheet member is embedded in the blade portion and in the lower end of the said shaft portion adjacent said heel portion. The peripheral contour of the blade section of the reinforcement member substantially corresponds to that of the blade of the stick but is slightly smaller than the stick blade. The shaft section of the reinforcement member extends into the lower end of the shaft portion.

The invention will now be described by way of examples and with reference to the accompanying drawings in which:

FIG. 1 is a schematic side view of an injection molding machine used in the method of this invention;

FIG. 2 is a side view of the hockey stick of the present invention;

FIG. 3 is an enlarged section 3—3 of FIG. 2;

FIG. 4 is an enlarged section 4—4 of FIG. 2;

FIG. 5 is an enlarged section 5—5 of FIG. 4;

FIG. 6 is an enlarged section 6—6 of FIG. 2;

FIG. 7 is a top view of the hockey stick of another embodiment of the present invention;

FIG. 8 is a side view of a reinforcing member for use in one embodiment of the present invention; and FIG. 9 is a section 9—9 of FIG. 8.

EXAMPLE 1

A mixture containing the following ingredients was prepared for injection molding of a hockey stick;

| | |
|---|---|
| nylon crystals | 64.1% by weight |
| fibre glass (average size about 10 microns diameter by 0.7 mm) | 33.1% by weight |
| nitrogen producing powder | 1.98% by weight |
| rubber particles | 0.02% by weight |

The material as described above is mixed thoroughly and fed into the hopper 10 (FIG. 1) the bottom outlet 11 of which communicates with the barrel of a feeding screw 13, the barrel being surrounded by heater bands 14, the front end of the barrel 12 terminating at a nozzle 15 communicating with the gate 16 of a mold 17 the two halves of which are selectively maintained together or remote from each other by a clamping device 18. The two halves of the mold 17 are each provided with cooling water passages 13 disposed in proximity to the hollow of the mold. The above features of the apparatus are well known per se and need not be described in greater detail. The mixture is advanced by the feed screw 13 and heated by the heat transferred to the advancing mixture by the barrel 12 from the heater bands 14, so that the temperature of the mixture reaches about 290° C at the nozzle 15 or in proximity thereof. The mixture is now in molten and foamed state and can thus be injected into the mold under pressure of about 300–400 p.s.i., which pressure is considerably lower than that required for unfoamed plastic material such as that used in prior art as referred to above. The mixture completely fills the mold cavity except, of course, the space occupied by a reinforcement blade 20 and its covering wings previously placed into the mold cavity and the shape of which will be described later. The cavity of the mold has the shape of a complete hockey stick so that the complete stick is molded in a single injection molding operation with the foamed material completely filling in the cavity of the mold. After the cavity has been filled with the material, the mold 17 remains closed and is cooled down by passing cooling water through water passages 19 for about 60 seconds which brings the temperature of the thermoplastic material to about 50° C, well below its melting point. Then the clamp mechanism 18 is actuated to open the mold whereupon the molded stick is removed from same. After removing the gate from the product, the hockey stick can be provided with label, printed or subjected to another treatment of its surface.

EXAMPLE 2

In producing a hockey stick without the reinforcement blade 20, the following mixture is used and processed in the same way as mentioned above:

| | |
|---|---|
| nylon crystals | 59% by weight |
| fiber glass (average size about 10 microns diameter by 0.7 mm) | 40% by weight |
| nitrogen producing powder | 0.98% by weight |
| rubber particles | 0.02% by weight |

Both of the above examples produce a good quality hockey stick, the specific weight and the overall weight distribution and other mechanical properties of which are remarkably similar to that of a wooden stick of comparable size.

The hockey stick produced by the method of the above examples will now be described in greater detail. The stick has a shaft 21 (FIG. 2) and a blade 22, the joinder of the two being referred to as a heel 23 of the stick. It will be appreciated that the stick of FIG. 2 is that produced by the method of Example 1 as referred above and the stick of FIG. 7 is the product of method of Example 2. It will be seen that a unitary hockey stick is shown which is made of foamed nylon reinforced with fibre glass and having (FIG. 2) an aluminum sheet reinforcement member 20. The member 20 is embedded in the blade 22 and partly in the heel end of the shaft 21. It can also be seen from FIG. 2 that the peripheral contour of the blade section of the reinforcement member 20 generally follows the contour of the blade 22 of the stick but is slightly smaller. The shaft section of the reinforcement member 20 extends into the lower end of the shaft 21 and terminates behind the flattened heel end (FIG. 7) of the shaft 21.

Both the blade section and the shaft section of the reinforcement member 20 are provided with pierced openings 24 which not only reduce the weight of the reinforcement member 20 but also contribute to a thorough bond between the plastic material and the reinforcement member 20. The openings 24 are pierced so as to provide to both sides thereof short outwardly flared wings 25 which are dimensioned so as to rest against the walls of the mold cavity to maintain the blade in a position centrally of the mold cavity prior to and during the injection of the above material.

The free end of the shaft 21 has a corrugated surface 26 provided by appropriate shaping of the mold cavity, to facilitate the grip of the stick by a player.

Tests have shown that the stick of the present invention is superior to anything similar in the field, particularly in weight and in weight distribution as well as in general "feel" of the stick. I have found that the use of the above blowing agent with the cooling down of the mold result in producing of a slightly denser surface layer 27 (FIG. 6), while the core 28 has a reduced density. This is of advantage as the denser surface is more suitable for subsequent surface treatment such as printing etc.

It will be appreciated that the disclosed embodiments of the present invention can be modified to a greater or lesser degree without departing from the scope of the present invention as defined in the accompanying claims.

The embodiments of the present invention in which an exclusive property or privilege is claimed are defined as follows:

1. A unitary hockey stick molded from foamed nylon and having a blade portion, a shaft portion and a heel portion and a unitary reinforcement sheet member embedded in said blade portion and in the lower end of said shaft portion, the peripheral contour of said blade portion of the reinforcement sheet member substantially corresponding to that of the blade but being slightly smaller than the blade, said reinforcement sheet member further having a shaft section which extends into the lower end of said shaft portion of the stick at said heel portion of the stick.

2. A hockey stick as claimed in claim 1 wherein the shaft has a flattened intermediate cross-section adjacent said heel and a full cross-section following said intermediate crosssection and wherein the shaft section of said reinforcement sheet member extends at least through the entire heel portion of the hockey stick and terminates in proximity to said full cross-section.

3. Hockey stick as claimed in claim 1, wherein said reinforcing member is provided with openings in both its blade section and its shaft section to facilitate the bond between the reinforcement member and the foamed nylon.

4. Hockey stick as claimed in claim 3, wherein said reinforcement member forms, at both sides of said openings outwardly flared wing members the free ends of said wing members being substantially coincident with the surface of said stick at said openings.

* * * * *